US011993219B2

(12) United States Patent
Fischer et al.

(10) Patent No.: US 11,993,219 B2
(45) Date of Patent: May 28, 2024

(54) ROOF MOUNTED OCCUPANT SAFETY SYSTEM

(71) Applicant: ZF Passive Safety Systems US Inc., Washington, MI (US)

(72) Inventors: Kurt F. Fischer, Rochester, MI (US); Douglas M. Gould, Lake Orion, MI (US); Hylus Ranjit Raj Jayakar, Shelby Township, MI (US); Gabriela Diaz, Sterling Heights, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 17/786,098

(22) PCT Filed: Oct. 22, 2020

(86) PCT No.: PCT/US2020/056740
§ 371 (c)(1),
(2) Date: Jun. 16, 2022

(87) PCT Pub. No.: WO2021/126363
PCT Pub. Date: Jun. 24, 2021

(65) Prior Publication Data
US 2023/0026681 A1 Jan. 26, 2023

Related U.S. Application Data (60) Provisional application No. 62/951,014, filed on Dec. 20, 2019.

(51) Int. Cl.
*B60R 21/214* (2011.01)
*B60R 21/00* (2006.01)
(Continued)

(52) U.S. Cl.
CPC ........... *B60R 21/214* (2013.01); *B60R 21/232* (2013.01); *B60R 2021/0048* (2013.01); *B60R 2021/23386* (2013.01)

(58) Field of Classification Search
CPC . B60R 21/214; B60R 21/232; B60R 21/2338; B60R 2021/0048;
(Continued)

(56) References Cited

U.S. PATENT DOCUMENTS 3,687,485 A * 8/1972 Campbell ............ B60R 21/213
280/733
8,403,358 B2 * 3/2013 Choi .................... B60R 21/214
280/743.2
(Continued)

FOREIGN PATENT DOCUMENTS

JP 2018070102 A * 5/2018
JP 2019043474 A * 3/2019

OTHER PUBLICATIONS

PCT International Search Report for corresponding International Application Serial No. PCT/US2020/056740, dated Jan. 26, 2021, pp. 1-2.

*Primary Examiner* — Laura Freedman
(74) *Attorney, Agent, or Firm* — TAROLLI, SUNDHEIM, COVELL & TUMMINO L.L.P.

(57) ABSTRACT

An apparatus for helping to protect an occupant of a vehicle having a roof and a cabin with a seat for the occupant includes an airbag configured to be deployed from a roof of the vehicle. The airbag includes a front panel configured to face the occupant and a rear panel configured to face away from the occupant. An external tether has ends connected to the rear panel on an exterior of the airbag. The external tether has a length measured between the ends that is shorter than the length of the rear panel extending between the connections of the external tether to the rear panel so as to
(Continued)

cause the airbag to have a curved portion when inflated and deployed, the curved portion facing convexly toward the occupant. In one example configuration, the curved portion can be configured to receive the occupants head and to unbend in response to receiving the occupants head, wherein the unbending causes the front panel to crumple and form creases. The configuration of the external tether, position of the external tether on the rear panel, and connections of the external tether to the rear panel can be configured to position the curved portion to receive the occupants head and to control the formation and location of the creases on the front panel.

22 Claims, 9 Drawing Sheets (51) Int. Cl.
*B60R 21/232* (2011.01)
*B60R 21/2338* (2011.01)
(58) Field of Classification Search
CPC ........... B60R 2021/23153; B60R 2021/23161; B60R 2021/23192; B60R 2021/23386
See application file for complete search history.

(56) References Cited

U.S. PATENT DOCUMENTS

| | | | | |
|---|---|---|---|---|
| 8,414,017 | B2 * | 4/2013 | Lee | B60R 21/231 |
| | | | | 280/743.1 |
| 9,308,883 | B1 * | 4/2016 | Schneider | B60R 21/231 |
| 9,446,733 | B2 * | 9/2016 | Pausch | B60R 21/2334 |
| 9,707,921 | B2 * | 7/2017 | Fischer | B60R 21/213 |
| 10,246,043 | B2 * | 4/2019 | Schneider | B60R 21/235 |
| 10,272,868 | B2 * | 4/2019 | Jaradi | B60R 21/264 |
| 10,414,371 | B2 * | 9/2019 | Zhang | B60R 21/2338 |
| 10,486,637 | B2 * | 11/2019 | Thomas | B60R 21/216 |
| 10,486,639 | B2 * | 11/2019 | Nagasawa | B60R 21/2338 |
| 10,583,799 | B2 * | 3/2020 | Schneider | B60R 21/2338 |
| 10,589,708 | B2 * | 3/2020 | Cho | B60R 21/0136 |
| 10,688,955 | B2 * | 6/2020 | Shin | B60R 21/214 |
| 11,059,449 | B2 * | 7/2021 | Jayakar | B60R 21/214 |
| 11,208,068 | B2 * | 12/2021 | Kim | B60R 21/23138 |
| 11,338,758 | B2 * | 5/2022 | Park | B60R 21/2338 |
| 11,345,300 | B2 * | 5/2022 | Fischer | B60R 21/239 |
| 11,479,203 | B2 * | 10/2022 | Jayakar | G02B 13/06 |
| 11,498,509 | B2 * | 11/2022 | Fischer | B60R 21/261 |
| 11,608,022 | B2 * | 3/2023 | Min | B60R 21/2338 |
| 11,613,226 | B2 * | 3/2023 | Fischer | B60R 21/233 |
| | | | | 280/730.1 |
| 11,639,148 | B2 * | 5/2023 | Jeong | B60R 21/214 |
| | | | | 280/730.1 |
| 11,648,908 | B2 * | 5/2023 | Sung | B60R 21/231 |
| | | | | 280/730.1 |
| 2006/0163848 | A1 * | 7/2006 | Abe | B60R 21/231 |
| | | | | 280/729 |
| 2012/0049491 | A1 | 3/2012 | Yoo | |
| 2017/0113646 | A1 | 4/2017 | Lee et al. | |
| 2019/0161046 | A1 | 5/2019 | Thomas | |
| 2019/0375363 | A1 | 12/2019 | Abe et al. | |
| 2021/0031718 | A1 * | 2/2021 | Schultz | B60R 21/231 |
| 2022/0212622 | A1 * | 7/2022 | Gould | B60R 21/216 |
| 2022/0250573 | A1 * | 8/2022 | Jayakar | B60R 21/232 |
| 2022/0371540 | A1 * | 11/2022 | Min | B60R 21/231 |
| 2023/0056934 | A1 * | 2/2023 | Min | B60R 21/213 |

\* cited by examiner

ROOF MOUNTED OCCUPANT SAFETY SYSTEM

RELATED APPLICATION

This application claims the benefit of U.S. Provisional Application Ser. No. 62/951,014, filed on Dec. 20, 2019, the disclosure of which is hereby incorporated by reference in its entirety.

TECHNICAL FIELD

The present invention relates generally to occupant safety systems and, in particular, relates to occupant safety systems including roof-mounted airbags for vehicles, such as autonomous vehicles, that depart from the architecture of traditional operator driven vehicles.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Frontal airbags can be driver airbags or passenger airbags. When inflated, the driver and passenger airbags help protect the occupant from impacts with parts of the vehicle such as the instrument panel and/or a steering wheel of the vehicle.

Other types of airbags include side airbags and curtain airbags, both of which are inflatable between a seated occupant and a side structure of the vehicle. When inflated, the side and curtain airbags help protect the occupant from impacts with the side structure of the vehicle.

There are trends in the auto industry to make vehicles more spacious. Styling has been making the instrument panel smaller and thus farther away from the occupant. State-of-the-art sensors and artificial intelligence (AI), combined with active and passive safety technologies, can help to prevent accidents or mitigate their consequences. These include intelligent driver assist systems with automated emergency driving maneuvers as well as external side airbags or the detection of the occupants seating position. Autonomous driving technologies can eliminate the need for some of the vehicle structure that is common to current vehicle architectures, leading to new interior concepts in which the occupant's seating position can vary.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle-front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the vehicle operator/driver. As a result, this also eliminates the necessity of vehicle passengers being positioned and oriented in the conventional manner described above. Vehicle manufacturers are free to utilize passenger cabin space as they see fit without being constrained to predetermined passenger arrangements, such as all forward-facing occupants, or vehicle structural configurations, such as steering wheel/instrument panel configurations, center console configurations, foot well, pedal controls, etc.

This presents the challenge of not only where to locate airbag systems, but also finding reaction surfaces against which to position the airbags so they can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surface.

When designing an occupant safety system, it can be important to design the airbag components of the system with head injury criteria as a focus. Among the criteria for which safety systems generally, and airbags specifically, can be designed, neck bending and/or loading is a focus. Neck bending results from the occupant's head movement forward and/or backward, i.e., along the sagittal plane, side-to-side, i.e., along the coronal plane, or a combination of these movements. Neck loading results from forces acting on the occupant's head that result in a force (e.g., a compressive force) being applied to the neck, i.e., to the cervical spine.

Neck bending/loading can occur when the occupant's head moves relative to the body/torso in response to impacting the airbag. This relative movement results in a bending and/or loading of the occupant's neck. Not only is it important to design the airbag to cushion the occupant's head during impacts with the airbag, it is also important to eliminate or reduce the degree to which reactive movement of the occupant's head creates bending and/or loading of the occupant's neck.

SUMMARY

From the above, it will be appreciated that the present invention is directed to a vehicle occupant safety system including an airbag and one or more external tethers that control the deployed shape of the airbag. An external tether connected to the rear panel restricts deployment of the rear panel so that the airbag takes on a curved configuration with a convexly curved portion of the front panel configured to face the occupant. The airbag is configured to be positioned so that the occupant's head impacts and penetrates the curved portion of the front panel in response to a vehicle collision. The airbag is also configured such that the curved portion of the airbag unbends in response to this penetration.

The unbending of the curved airbag portion causes the front panel to crumple and form creases in the front panel. The external tether and its connections to the rear panel are configured to cause the crumpling and position the creases at a predetermined location relative to the occupant's head. The creases can, for example, be positioned just above and just below the occupant's head.

The creases help define a chamber for receiving the occupant's head. Due to the folding of the airbag fabric forming the creases, that material undergoes less tension in response to pressurization of the airbag when deployed. Because of this, the chamber can move relative to the remaining airbag portions in response to occupant head penetration, due to shifting and/or unfolding of the creases. Permitting this relative movement can help reduce bending and/or loading of the occupant's neck produced by head movements in reaction to impacting the airbag. The creases thereby help enhance occupant protection in this manner.

Additionally, the creases can be positioned in the areas above and below the penetrating occupant's head, i.e., at or above the head and below the chin. This configuration can help position the creases to prevent the occupant's chin from entering the crease and from engaging adjacent portions of the front panel. This is because the creases form spaces or gaps between the chamber and the adjacent portions of the airbag. The gaps help avoid head/chin contact with adjacent airbag surfaces, which helps reduce the degree to which engagement of the airbag with the occupant's head and chin results in neck bending/loading.

According to one aspect, an apparatus for helping to protect an occupant of a vehicle having a roof and a cabin with a seat for the occupant includes an airbag configured to be deployed from a roof of the vehicle. The airbag includes a front panel configured to face the occupant and a rear panel configured to face away from the occupant. An external tether has ends connected to the rear panel on an exterior of the airbag. The external tether has a length measured between the ends that is shorter than the length of the rear panel extending between the connections of the external tether to the rear panel so as to cause the airbag to have a curved portion when inflated and deployed, the curved portion facing convexly toward the occupant.

According to another aspect, the curved portion can be configured to receive the occupant's head and to unbend in response to receiving the occupant's head, wherein the unbending causes the front panel to crumple and form creases. The configuration of the external tether, position of the external tether on the rear panel, and connections of the external tether to the rear panel can be configured to position the curved portion to receive the occupant's head and to control the formation and location of the creases on the front panel.

According to another aspect, alone or in combination with any other aspect, the external tether can be configured to locate the creases on the front panel at a position above the occupant's head and/or below the occupant's chin.

According to another aspect, alone or in combination with any other aspect, the external tether can be configured to locate a crease on the front panel at a position above the occupant's head and a crease on the front panel at a position below the occupant's chin.

According to another aspect, alone or in combination with any other aspect, the creases can be configured to define a chamber configured to receive the occupant's head, the chamber being separated from adjacent portions of the airbag by the creases. The creases can be configured to shift and/or unfold in response to occupant penetration into the chamber to permit the chamber to move relative to adjacent portions of the airbag. The creases can also be configured to form a gap for preventing the top of the occupant's head from engaging portions of the airbag adjacent the chamber. The creases can also be configured to form a gap for preventing the occupant's chin from engaging portions of the airbag adjacent the chamber. The creases can also be configured to form a gap for preventing the occupant's head from engaging portions of the airbag adjacent the chamber to reduce loading and/or bending of the occupant's neck.

According to another aspect, alone or in combination with any other aspect, the creases in the front panel correspond to the locations where the external tether is connected to the rear panel.

According to another aspect, alone or in combination with any other aspect, the apparatus can include an additional external tether connected to the airbag. The additional external tether can be configured to control the deployment trajectory of the airbag from the roof. An additional external tether can also be configured to control the inflated shape of the airbag so that the airbag can conform to architecture of the vehicle.

According to another aspect, alone or in combination with any other aspect, an airbag module can include the apparatus, an inflator that is actuatable to produce inflation fluid for inflating and deploying the airbag, and a housing for supporting the airbag and inflator on the vehicle roof. The airbag module can be a component of a vehicle safety system. The vehicle safety system can also include a sensor for sensing the occurrence of an event for which deployment of the airbag is desired and producing a signal indicative thereof. A controller can be connected to the sensor and, in response to receiving the signal, actuating the inflator to inflate and deploy the airbag.

DESCRIPTION

Figure 1:
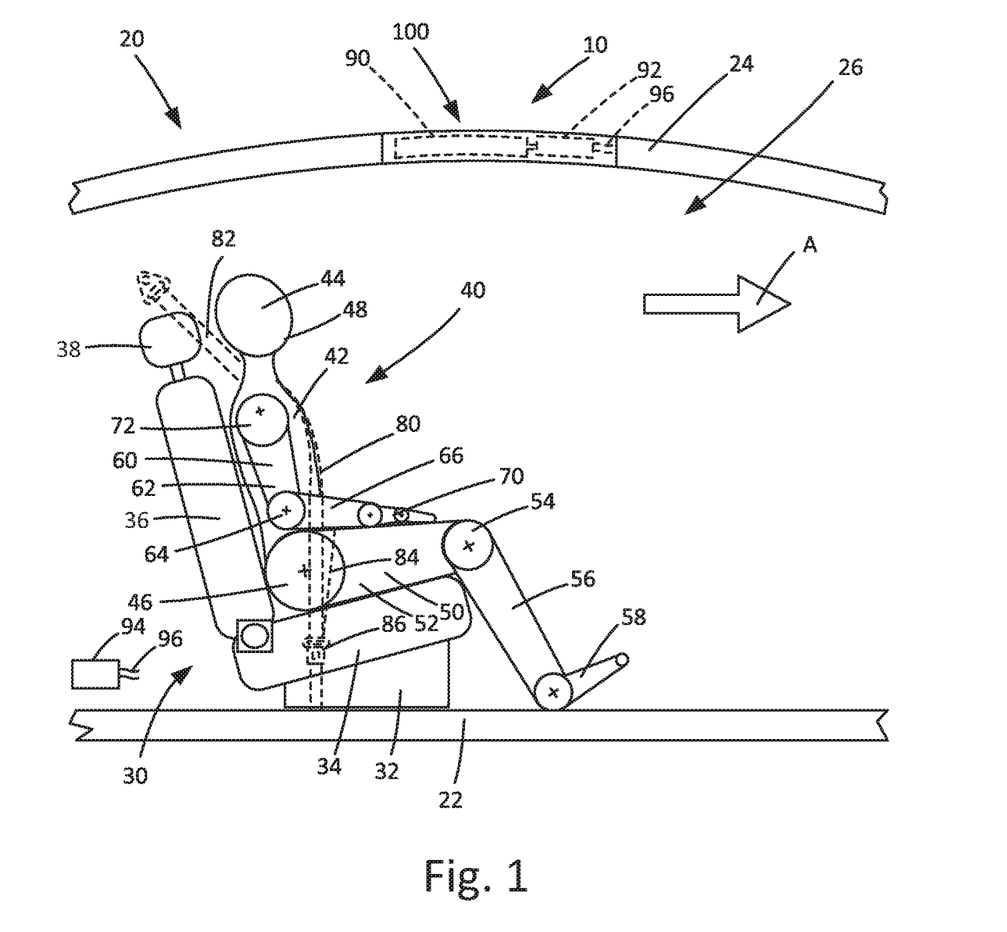
FIG. 1 is a schematic illustration of an apparatus for helping to protect an occupant of a vehicle, illustrating the apparatus in a pre-deployment condition.

Referring to FIG. 1, according to a first example configuration, a vehicle safety system 10 helps protect an occupant 40 of a vehicle 20. In the example configuration of FIG. 1, the vehicle 20 is an autonomous vehicle, including a passenger cabin 26 in which a vehicle seat 30 is positioned with a vehicle occupant 40 seated thereon. In this description, the vehicle 20 is considered a driverless, autonomous vehicle, which lacks the typical structure, such as steering wheel, controls, and instrumentation, typically found in operator driven vehicles. Owing to the autonomous configuration of the vehicle 20, FIG. 1 illustrates an open configuration of the passenger cabin 26 and does not show any structure positioned in front of the occupant 40. Those skilled in the art will, however, appreciate that the safety system(s) disclosed herein could also be used in a conventionally driven vehicle.

The vehicle seat 30 includes a base 32 connected to the vehicle 20, e.g., to the floor 22. The seat base 32 supports a seat bottom 34. A seatback 36 extends upward from the seat bottom 34 and has a reclined position that can be adjusted. A headrest 38 is positioned at an upper end of the seatback 36.

The occupant 40 is seated on the seat 30, with his/her torso 42 resting on the seatback 36, head 44 positioned at or near the headrest 38, and buttocks 46 and legs 50 (more specifically upper legs 52) resting on the seat bottom 34. The occupant's lower legs 56 extend from the knee 54 downward toward the vehicle floor 22, where the occupant's feet 58 rest. In the typical occupant position of FIG. 1, the occupant's arms 60 are at his/her side, with the upper arms 62 adjacent and parallel to the torso 42, bent at the elbows 64 with the lower arms/forearms 66 and hands 70 resting on the upper legs 52.

As shown in FIG. 1, the occupant 40 is restrained by a seatbelt 80, which is a conventional three-point restraint including a shoulder belt portion 82 that extends across the occupant's shoulder 72, and a lap belt portion 84 that extends across the occupant's lap, i.e., where the upper legs 50 meet the torso 42. The seatbelt 80 is secured via a buckle 86, which is anchored to the vehicle 20. To simplify the drawings, the seatbelt 80 is illustrated only in FIGS. 1 and 8A/8B. In the remaining figures, i.e., FIGS. 2-6, the seatbelt is not shown. It is to be understood, however, that in those figures (FIGS. 2-6), the occupant 40 is wearing a seatbelt, it just isn't shown. The occupant movements illustrated and described with reference to FIGS. 2-6 are therefore those that would take place with normal use of the seatbelt 80 illustrated in FIG. 1.

Figure 2:
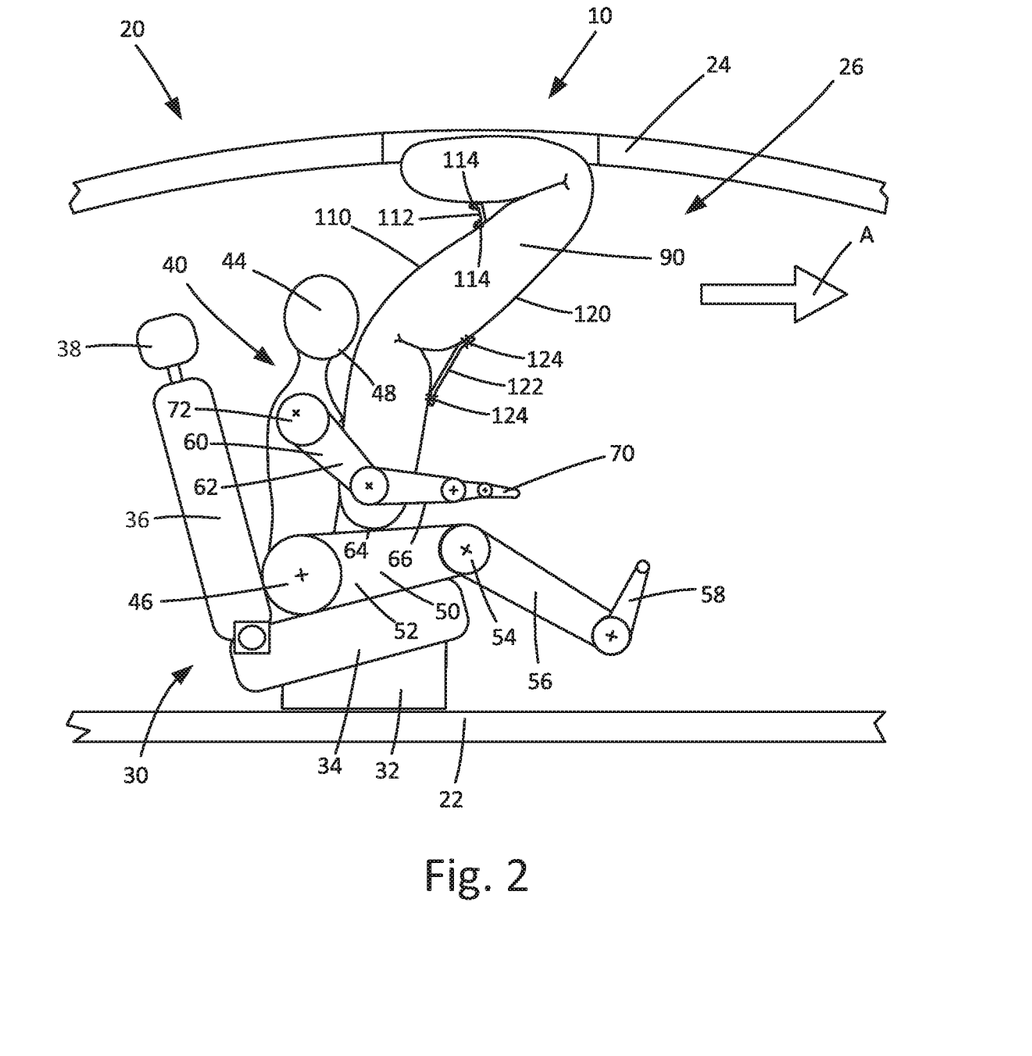
FIG. 2 is a schematic illustration of the apparatus in a deployed condition, according to a first example configuration.
Figure 3:
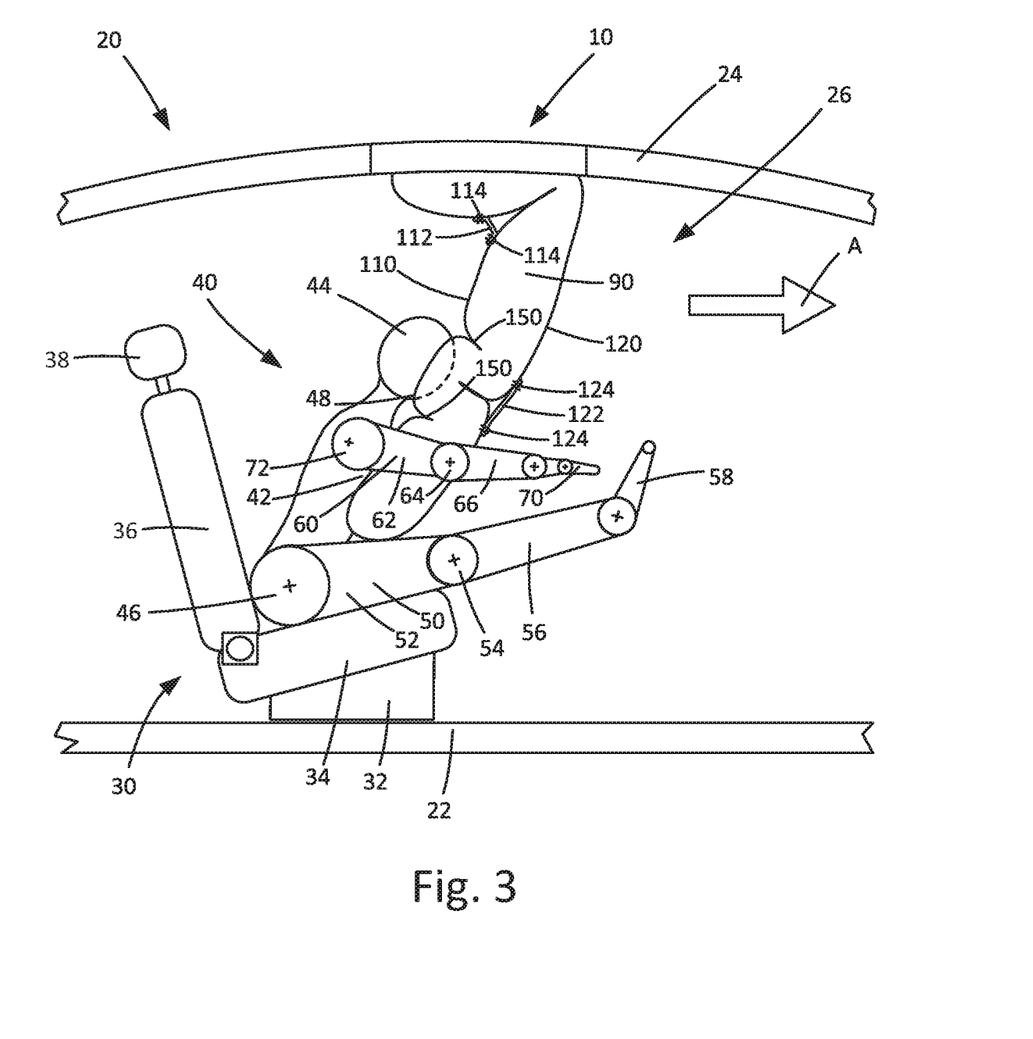
FIG. 3 is a schematic illustration of the apparatus of the apparatus of FIG. 2 receiving the occupant.

Referring to FIGS. 1-3, according to one example configuration, a vehicle safety system 10 helps protect the occupant 40 of the vehicle 20. As shown in FIGS. 1 and 2, the system 10 includes an airbag 90 mounted in a roof 24 of the vehicle 20. Being an autonomous vehicle 20, the passenger compartment or cabin is without operator controls, such as a steering wheel, pedals, instrumentation, center console, etc. Accordingly, the instrument panel is reduced in size and/or removed altogether in order to maximize the space in the cabin. Control interfaces for climate controls, GPS, navigation, entertainment, etc. can, for example, be provided in a center console area of the vehicle 20 located between the passengers of the front and/or rear rows.

In this open passenger cabin configuration, vehicle seats 30 can be configured, positioned, and arranged in a variety of manners, not constrained by the need to facilitate a vehicle driver/operator. For example, in FIGS. 1-3, the seat 30 is a forward-facing seat, facing in the direction of forward vehicle travel indicated generally by the arrow labeled A. Other seating configurations, such as those shown in and described with regard to FIGS. 8A and 8B, can be implemented.

The airbag 90 of the safety system 10 implemented in the vehicle 20 of FIGS. 1-3 can be part of an airbag module 100 that includes an inflator 92 that is actuatable to provide inflation fluid for inflating and deploying the airbag. As shown in FIGS. 1-3, the safety system 10 also includes a sensor/controller 94 configured to sense the occurrence of an event for which occupant protection is desired, such as a collision. In response to sensing the event, the sensor/controller 94 is operative to provide a signal for actuating the inflator 92, e.g., via lead wires 96.

When actuated, the airbag 90 deploys downward from the vehicle roof 24 in front of the occupant 40. FIG. 1 illustrates the airbag 90 in a deflated and stored condition prior to deployment. FIG. 2 illustrates the airbag 90 in an inflated and deployed condition prior to the occupant 40 impacting the bag. FIG. 3 illustrates the airbag 90 in an inflated and deployed condition with the occupant 40 impacting the bag.

Figure 4A:
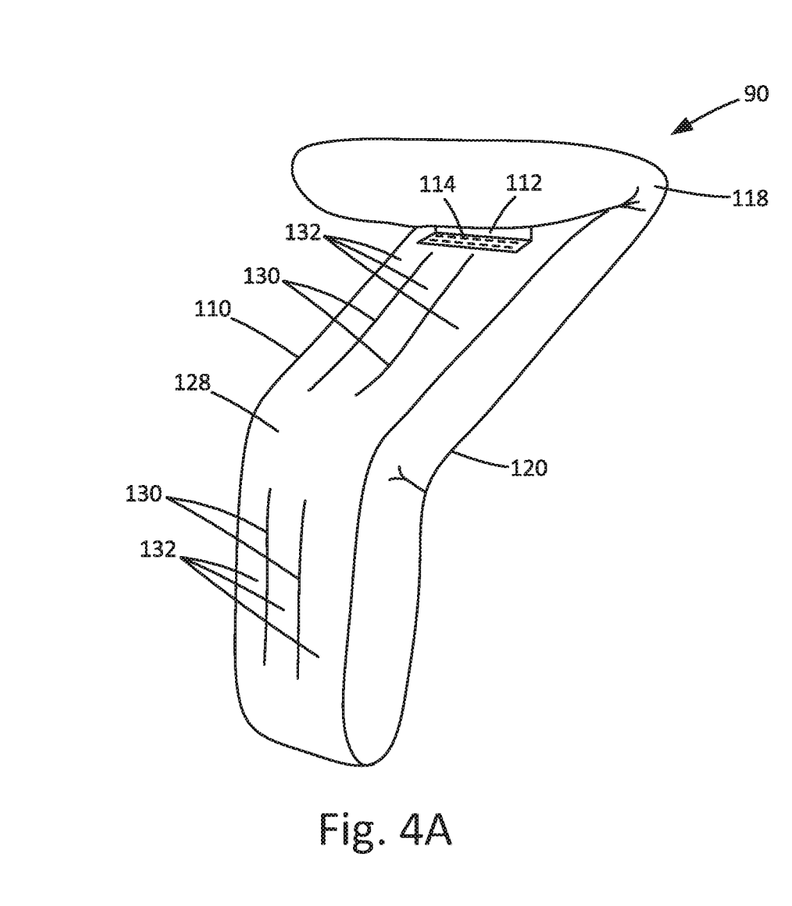
FIG. 4A is a perspective view of the apparatus, according to the first example configuration.
Figure 4B:
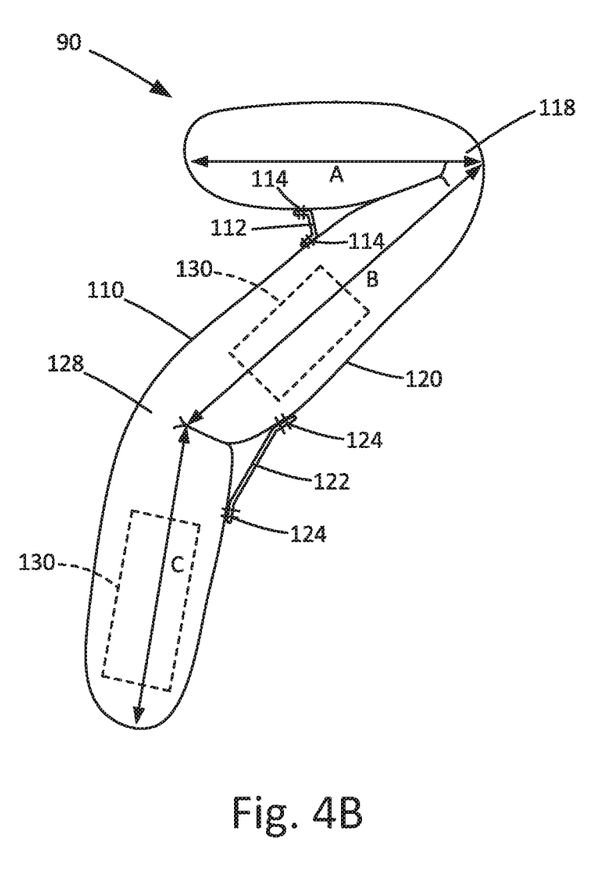
FIG. 4B is a schematic side view of the apparatus of FIG. 4A, illustrating certain dimensions of the apparatus.
Figure 4C:
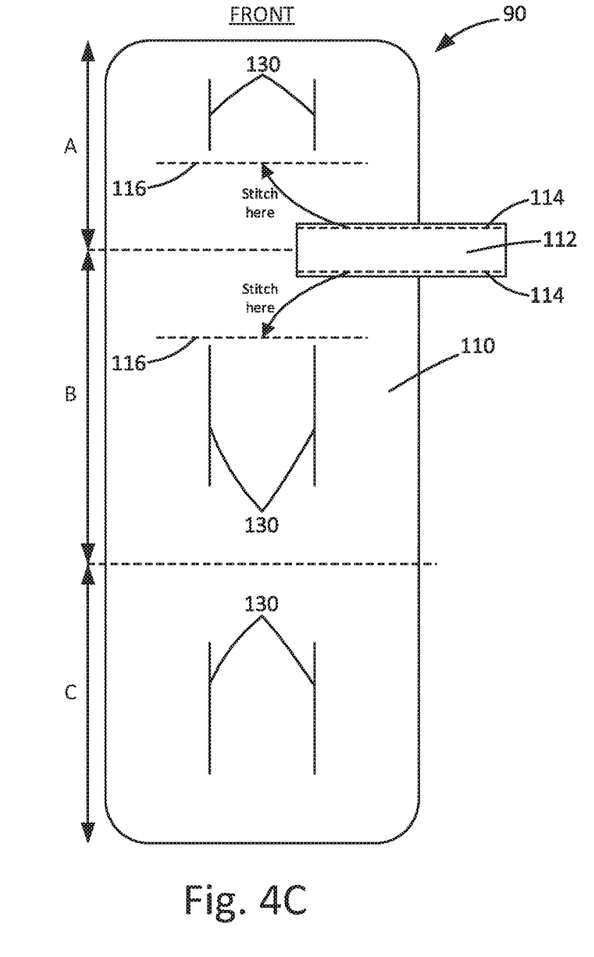
FIGS. 4C and 4D are front and rear plan views, respectively, illustrating the construction of the apparatus of FIGS. 4A and 4B.
Figure 4D:
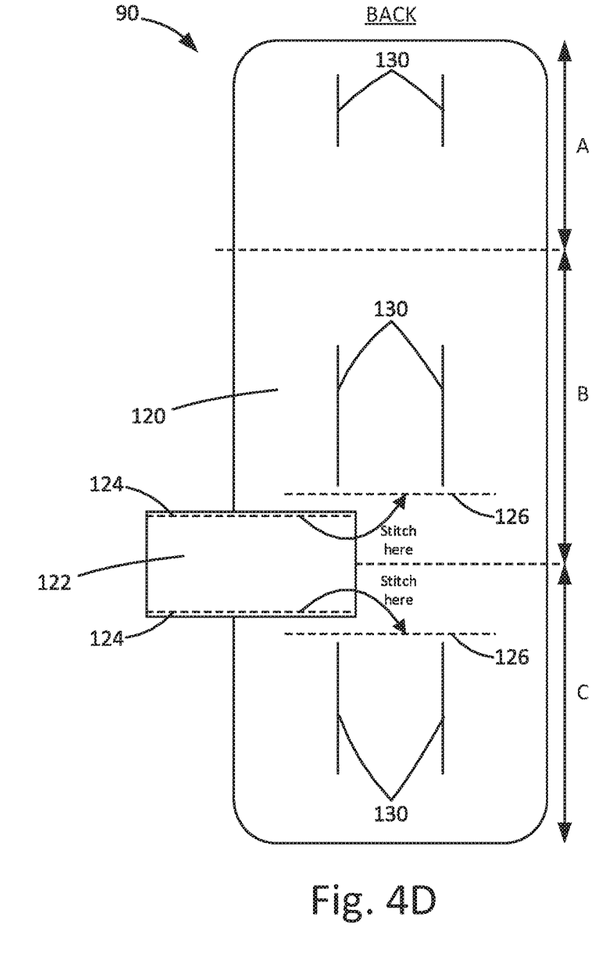

The airbag 90 can have a variety of constructions. For example, referring to FIGS. 4A-D, the airbag 90 can have a two panel construction, including a front panel 110 and a rear panel 120. Each panel 110, 120 has a length (long dimension as shown in FIGS. 4C-4D) and a width (short dimension as shown in FIGS. 4C-4D). The panels 110, 120 are positioned overlying each other and interconnected about their peripheries to define a confinement, i.e., an inflatable volume, of the airbag 90.

Internal tethers 130 can interconnect the panels 110, 120 within the periphery of the airbag 90. As shown, the internal tethers 130 can extend longitudinally, i.e., along the length of the bag. In the example configuration illustrated in FIGS. 4A-4D, the internal tethers 130 extend longitudinally in segments that intermittently interconnect the panels 110, 120 along the length of the airbag 90. In this example configuration, two sets of longitudinally extending internal tethers 130 include multiple segments that divide the inflatable volume of the airbag 90 into longitudinally extending chambers 132. In the example configuration of FIGS. 4A-4D, the two sets of internal tethers 130 define three chambers 132 across the width of the airbag 90.

The configuration of the internal tethers 130 could differ from that illustrated in the example configuration of FIGS. 4A-4D. For example, instead of internal tethers 130 that extend in multiple segments along the length of the airbag 90, the internal tethers 130 could extend in one continuous segment, i.e., one long tether. Additionally, the number of internal tethers spaced widthwise across the airbag 90 could be greater or fewer than two, creating greater or fewer than three longitudinally extending chambers 132. In fact, the airbag 90 could be free from internal tethers, in which case the airbag would include a single contiguous chamber. Moreover, although the internal tethers 130 are illustrated as extending linearly, the internal tethers could extend in a curved manner or in combinations of linear and curved. Furthermore, instead of extending in the same, uniform direction, the internal tethers 130 could extend in different directions.

The internal tethers 130 can be in the form of stitching that interconnects the panels 110, 120 directly. Alternatively, as shown in the example configuration of FIGS. 4A-4D, the internal tethers 130 can be formed of a separate tether, e.g., an elongated strip of material, with one edge connected to the top/front panel 110 and an opposite edge connected to the bottom/rear panel 120. In another alternative construction, the airbag 90 can have a one piece woven (OPW) construction in which the front and rear panels 110, 120 are woven simultaneously and interwoven to define the peripheral connection and the internal tethers 130.

As shown in FIGS. 2-3, the airbag also includes external tethers that interconnect portions of the airbag panels. One external tether 112 interconnects portions of the front panel 110, and another external tether 122 interconnects portions of the rear panel 120. As shown in FIGS. 4B-4D, the external tethers 112, 122 are interconnected with their respective airbag panels 110, 120 by connections 114, 124, respectively, such as stitching or other connections (e.g., adhesives, ultrasonic welds, bonding, etc.), that extend across the width of the airbag 90, i.e., transverse/perpendicular to the length of the airbag and to the internal tethers 130. In the example configuration of FIGS. 4A-4D, the external tethers 112, 122 are connected to the panels 110, 120 by the stitching 114, 124 at stitch lines 116, 126 identified with "stitch here" designations on the panels in FIGS. 4C and 4D.

The internal tethers 130 and external tethers 110, 120 combine to shape the airbag 90 so that it affords the desired coverage for protecting the occupant 40. Referring to FIGS. 4A-4D, the internal tethers help control the inflated thickness of the airbag by restricting movement of the front and rear panels 110, 120 away from each other. This also forms the longitudinally extending chambers 132 of the airbag 90. Controlling the chamber configuration and the thickness of the airbag 90 helps control the volume of the airbag, which helps reduce the amount/volume of inflation fluid required to deploy and pressurize the airbag. The airbag 90 can therefore be configured so that deployment and pressurization occurs within a desired amount of time.

For purposes of discussion and description, the airbag 90 can be divided into longitudinally extending portions or segments. These segments are identified as segments A, B, and C in FIGS. 4A-4D. Segment A is the uppermost segment and is where the airbag 90 is secured to the vehicle roof 24. Segment A can also provide occupant protection by cushioning the occupant 40 from impacts with the roof 24. Segments B and C are presented in front of the vehicle seat 30 and occupant 40, and therefore help provide the occupant protection described herein.

In the example configuration of FIGS. 4A-4D, it can be seen that the longitudinally segmented internal tethers 130 coincide with the airbag segments A, B, and C. The breaks in the internal tethers 130, i.e., the untethered portions of the airbag 90 coincide with the transitions between the segments (see, FIGS. 4A-4B). Each segment A, B, and C therefore includes three longitudinally extending chambers 132.

The external tethers 112, 122 each have a length measured longitudinally with respect to the airbag 90, i.e., the dimension measured parallel to the length of the airbag as shown in FIGS. 4C and 4D. The stitch lines 116, 126 to which the opposite ends of each external tether 112, 122 are connected to their respective panels 110, 120 are spaced from each other a distance greater than the length of the associated external tether 112, 122. Additionally, for each pair of stitch lines 116, 126, one stitch line is positioned in one of the airbag segments and the other is positioned in the adjacent segment. Thus, one of the stitch lines 116 is positioned in airbag segment A and the other is positioned in airbag segment B. Similarly, one of the stitch lines 126 is positioned in airbag segment B and the other is positioned in airbag segment C.

The external tethers 112, 122 help control the inflated shape of the airbag 90 by restricting movement of portions of the airbag relative to each other. When the airbag 90 is inflated and deployed, the external tethers 112, 122 restrict relative movement of the airbag segments to which they are attached. As a result of the external tethers, bends are formed between adjacent segments of the airbag 90.

The side of the airbag 90 on which the external tethers 112, 122 are connected determines the direction of the bend created by the tethers. More specifically, the first external tether 112 forms a bend 118 between airbag segments A and B. The second external tether 122 forms a bend 128 between airbag segments B and C. Because the first external tether 112 is attached to the front panel 110 of the airbag 90, the first bend 118 is concave on the front panel and convex on the rear panel 120. Similarly, because the second external tether 122 is attached to the rear panel 120 of the airbag 90, the second bend 128 is concave on the rear panel and convex on the front panel 110.

The degree of bending between the airbag segments depends on the differential between length of the external tethers 112, 122 and the distance between the stitch lines 116, 126 to which they are connected. The bigger the length-distance differential, the larger the degree of bending and the smaller the angle between the airbag segments between which the bends 118, 128 are formed. Conversely, the smaller the length-distance differential, the smaller the degree of bending and the larger the angle between the airbag segments between which the bends 118, 128 are formed.

As shown in FIGS. 4A and 4B, the first external tether 112 is configured to have a high length-distance differential and, therefore, the bend between airbag segments A and B is large, and the angle between airbag segments A and B is small. Conversely, the second external tether 122 is configured to have a low length-distance differential and, therefore, the bend between airbag segments B and C is small, and the angle between airbag segments B and C is large.

In the example configuration of the airbag 90 shown in FIGS. 1-4D, the external tethers 112, 122 are configured to give the airbag an overall "7" shape when viewed in profile (see, e.g., FIGS. 2 and 4B). Connected to and deploying from the vehicle roof as shown in FIG. 2, the airbag 90 initially deploys forward and downward from the roof 24. Absent the external tethers 112, 122, it can be seen that the airbag 90 would tend to inflate and deploy to a generally rectangular, mattress-shaped configuration along the underside of the vehicle roof 24. As the airbag 90 inflates and deploys, the airbag segments A, B, C inflate, pressurize, and act on the external tethers 112, 122. The external tethers 112, 122 control the degree to which the airbag segments A, B, C can move relative to each other toward that rectangular, mattress-shaped configuration. As a result, the bends 118, 128 are formed and maintained, resulting in the illustrated (i.e., "7-shaped") configuration.

As shown in FIG. 2, the generally 7-shaped configuration can be configured to position the airbag 90 extending in front of the occupant, with the bend 118 positioned in front of the occupant's head 44. Airbag segment B extends down to and covers a portion of the occupant's head 44. Airbag segment C also covers a portion of the occupant's head 44 and extends downward, covering the occupant's torso 42, and terminating at the occupant's upper legs 50.

The bend 128 between the airbag segments B and C is positioned at the with the bend facing convexly toward the occupant's head 44. Of course, the positioning of the airbag portions B and C relative to the occupant will vary depending on the size of the occupant and the seating position of the occupant. The airbag can therefore be configured to assume the illustrated inflated and deployed position for an occupant having a physiology selected according to statistics that place that person within certain segments of the population. The airbag can, for example, be configured to accommodate the physiology of an occupant sized according to National Highway Transportation Safety Administration (NHTSA) guidelines, such as a $50^{th}$ percentile male occupant, a $95^{th}$ percentile male occupant, or a $5^{th}$ percentile female.

In development and testing of vehicle safety systems, manufacturers and safety authorities rely on statistical models and data to help quantify performance criteria and measure system performance. In doing so, reference is made to statistical vehicle occupants that represent the physical characteristics of vehicle occupants for which vehicle safety systems are meant to protect. These statistical occupants include a $50^{th}$ percentile male occupant (50% male), a $95^{th}$ percentile male occupant (95% male), and a 5$^{th}$ percentile female occupant (5% female).

The 50% male is derived from statistical values for the U.S. male population. The 50% male has the mean height and weight of the male U.S. population, meaning that roughly half of the U.S. male population is taller/heavier and roughly half of the U.S. male population is shorter/lighter. The 50% male is thus an average or medium sized male occupant.

The 95% male is derived from statistical values for the U.S. male population. The 95% male has the mean height and weight that is taller/heavier than roughly 95% of the male U.S. population, meaning that only roughly 5% of the U.S. male population is taller/heavier and roughly 95% of the U.S. male population is shorter/lighter. The 95% male is thus a large sized male occupant.

The 5% female is derived from statistical values for the U.S. female population. The 5% female has a mean height and weight that, is taller/heavier than only roughly 5% of the U.S. female population. Conversely, this means that roughly 95% U.S. female population is taller/heavier than the 95% female. The 5% female is thus a small female occupant.

The curved configuration of the airbag 90 resulting from the external tethers 112, 122 produces a desired positioning of the airbag relative to the occupant 40 and also shapes the airbag. Due to this positioning and shaping, the surface of the airbag 90 presented facing the occupant 40, i.e., the front panel 110, is contoured so as to receive the occupant in a desired manner. The tether 112 forms the bend 118 that controls the trajectory or direction at which airbag segments B and C deploy toward the occupant 40, as well as their final positions relative to the occupant once the airbag 90 is inflated. The tether 122 controls the curved shape of airbag segments B and C, as well as the position of the bend 128 on the airbag 90. Together, the external tethers 112, 122 are configured to position the airbag 90 and the location of the bend 128 relative to the occupant 40, as shown in FIG. 2.

The bend 128 between airbag segments B and C is advantageous because it follows the curved nature of the occupant 40, restrained by the seatbelt 80, as the occupant leans or bends forward into contact with the airbag. The curved surface of the airbag 90 at the bend 128 receives the forward-moving occupant 40 and conforms to the occupant, cushioning the occupant and providing a desired ride-down effect. Because the terminal end of the lower portion C is positioned in the lap/hip region of the occupant, the lower end of the airbag is received between the upper legs 50 and torso 42 and trapped or blocked from forward movement in response to the penetrating occupant 40. As a result, movement and penetration of the upper torso 42 and head 44 into the airbag 90 tends to straighten or un-bend the bend 128.

When this un-bending of the bend 128 occurs, the unbending/uncurving can cause the front panel 110 to crumple and form creases 150 in the convex surface of the front panel. It is the differential in lengths of the front and rear panels 110, 120 along the bend/curve that produces this crumpling and the resultant formation of the creases. The unbending causes airbag segments B and C to straighten take on a more linear shape. Because, however, the second external tether 122 is connected to the rear panel 120, the effective length of the rear panel is maintained shorter than the length of the front panel 110, despite the unbending. As a result of this length differential between the front and rear panels 110, 120, the crumpling occurs and the creases 150 are formed form in the front panel 110 in regions of the upper and lower extents of the bend 128.

The areas in which the crumpling occurs and the creases 150 form correspond generally to the locations of the stitch lines 126 connecting the second external tether 122 to the rear panel 120. Accordingly, the locations where the creases 150 form can be selected through the configuration of the second external tether 122 and the locations of the stitch lines 126 connecting it to the airbag 40. Advantageously, the manufacture of the airbag 90 is not complicated because the tethers 112 and 122 are external. The airbag 90 is therefore simple and easy to manufacture.

Figure 5:
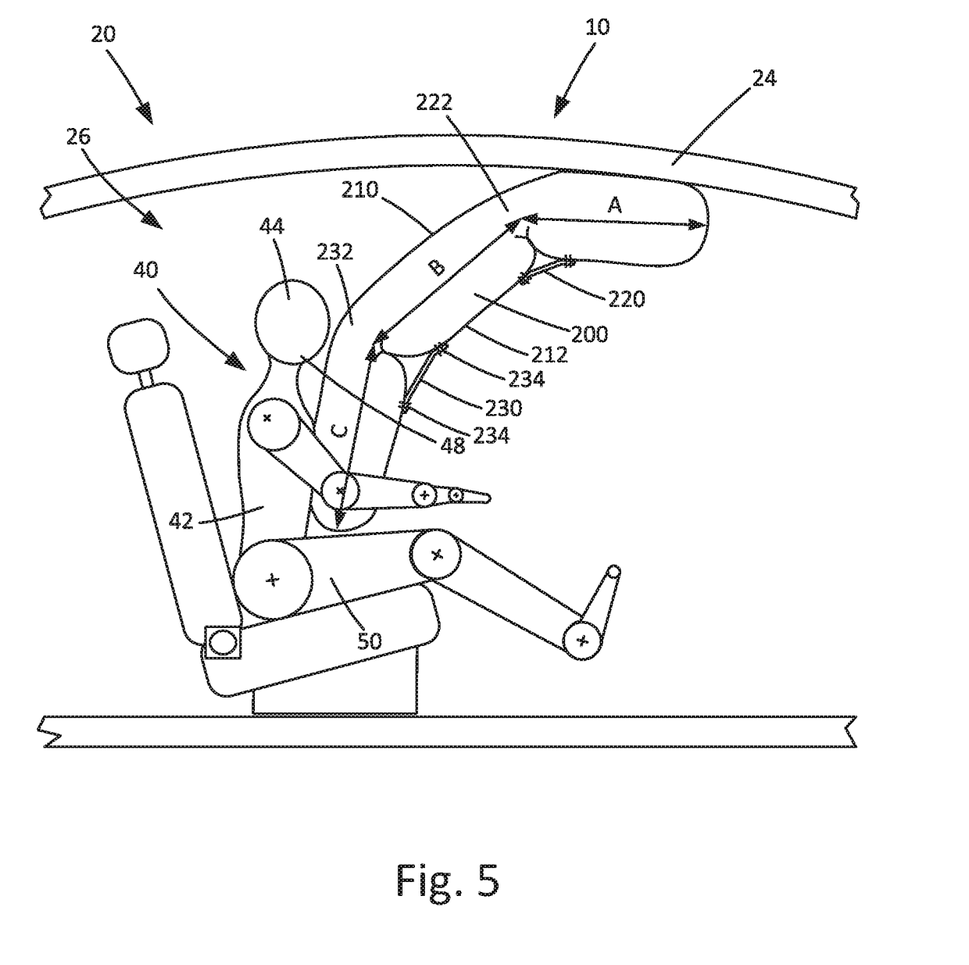
FIG. 5 is a schematic illustration of the apparatus in a deployed condition, according to a second example configuration.

Another example configuration of the vehicle safety system 10 is shown in FIG. 5. According to this configuration, the system 10 includes an airbag 200 that is constructed with external tethers 220, 230 that are configured to produce the illustrated airbag shape when inflated and deployed. In this configuration, both external tethers 220, 230 are connected to a rear panel 212 of the airbag 200, which causes formation of the bends 222, 232. The bends 222, 232 help define or delineate segments A, B, C of the airbag 200. The upper airbag segment A is connected to the vehicle roof 24, which supports the airbag 200.

The bends 222, 232 cause the airbag 200 to take on a shape that differs from that of the embodiment illustrated in FIGS. 1-3. The airbag 200 extends partially along the roof 24 in a generally arcuate manner, terminating at the intersection of the occupant's upper legs 50 and torso 42. This curved shape 200 can be dictated, for example, by the configuration of the passenger cabin 26 and the space available therein. As shown, the bend 222 controls the deployment trajectory of airbag segments B and C from the roof 24, and also the inflated and deployed position of the airbag segments B and C. Together, the external tethers 220, 230 are configured to position the airbag 200 and the location of the bend 232 relative to the occupant 40, as shown in FIG. 5.

The bend 232 between airbag segments B and C is advantageous because it follows the curved nature of the occupant 40, restrained by the seatbelt, as the occupant leans or bends forward into contact with the airbag. The curved surface of the airbag 200 at the bend 232 receives the forward-moving occupant 40 and conforms to the occupant, cushioning the occupant and providing a desired ride-down effect. Because the terminal end of the lower portion C is positioned in the lap/hip region of the occupant, the lower end of the airbag is received between the upper legs 50 and torso 42 and trapped or blocked from forward movement in response to the penetrating occupant 40. As a result, movement and penetration of the upper torso 42 and head 44 into the airbag 200 tends to straighten or un-bend the bend 232.

When this un-bending of the bend 232 occurs, the unbending/uncurving can cause the front panel 210 to crumple and form creases in the convex surface of the front panel. It is the differential in lengths of the front and rear panels 210, 212 along the bend/curve that produces this crumpling and the resultant formation of the creases. The unbending causes airbag segments B and C to straighten take on a more linear shape. Because, however, the second external tether 230 is connected to the rear panel 212, the effective length of the rear panel is maintained shorter than the length of the front panel 210, despite the unbending. As a result of this length differential between the front and rear panels 210, 212, the crumpling occurs and the creases are formed in the front panel 210 in regions of the upper and lower extents of the bend 232.

The areas in which the crumpling occurs and the creases form correspond generally to the locations of the stitch lines 234 connecting the external tether 230 to the rear panel 212.

Accordingly, the locations where the creases form can be selected through the configuration of the external tether 230 and the locations of the stitch lines 234 connecting it to the airbag 200. Advantageously, the manufacture of the airbag 200 is not complicated because the tethers 220 and 230 are external. The airbag 200 is therefore simple and easy to manufacture.

Figure 6:
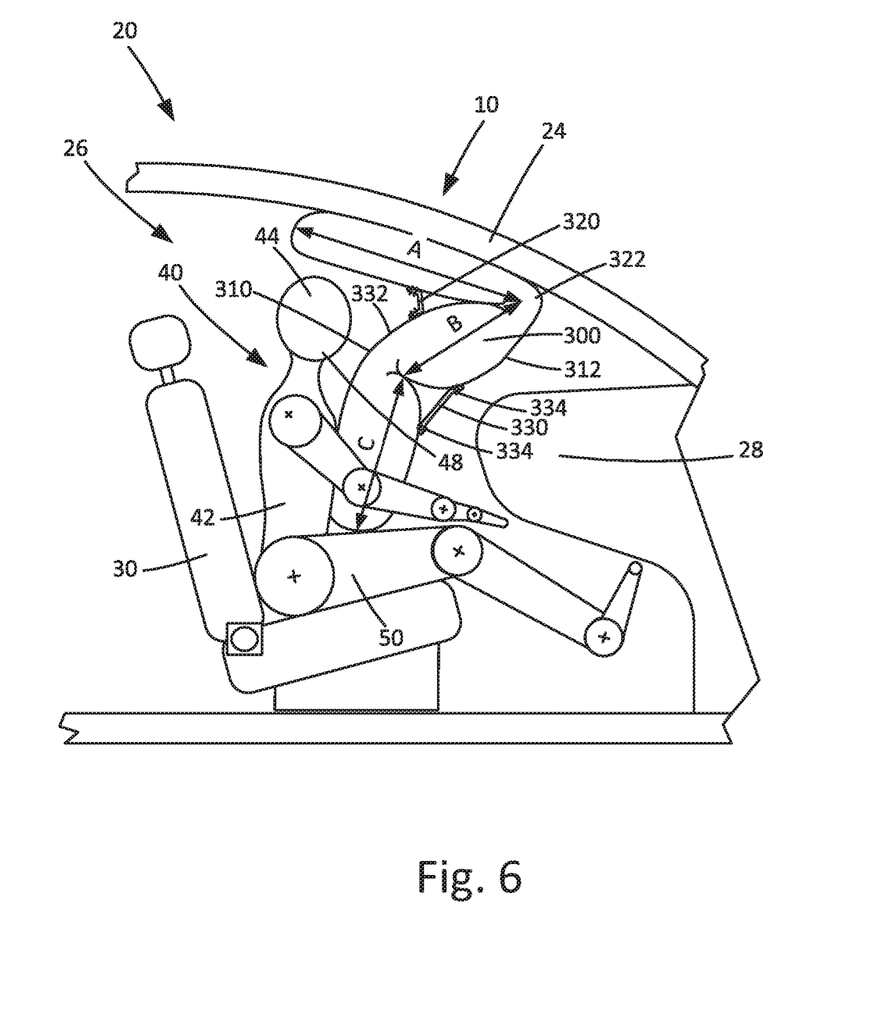
FIG. 6 is a schematic illustration of the apparatus in a deployed condition, according to a third example configuration.

Another example configuration of the vehicle safety system 10 is shown in FIG. 6. According to this configuration, the system 10 includes an airbag 300 that is constructed with external tethers 320, 330 that are configured to produce the illustrated airbag shape when inflated and deployed. In this configuration, the external tether 320 is connected to the front panel 310, and the external tether 330 is connected to the rear panel 312 of the airbag 300. The external tethers 320, 330 cause formation of the bends 322, 332, respectively. The bends 322, 332 help define or delineate segments A, B, C of the airbag 300. The upper airbag segment A is connected to the vehicle roof 24, which supports the airbag 300.

The bends 322, 332 cause the airbag 300 to take on a shape that is similar to that of the embodiment illustrated in FIGS. 1-3, that is, the general shape of the number seven (7). In FIG. 6, the airbag 300 is configured for a front seat position of the occupant 40 where the seat 30 is positioned in close proximity to and facing the instrument panel 28. In this front seat position, the roof 24 can be sloping downward toward the front of the vehicle 20 and can therefore be positioned closer to the occupant. For this reason, the airbag 300 can be configured so that segment A extends along the roof 24 above the occupant's head 44 in order to help protect the occupant 40 from impacts with the roof.

From the roof 24, airbag segments B and C extend in a generally arcuate manner downward and toward the occupant 40, terminating at the intersection of the occupant's upper legs 50 and torso 42. As shown, the bend 322 controls the deployment trajectory of airbag segments B and C from the roof 24, and also the inflated and deployed position of the airbag segments B and C. Together, the external tethers 320, 330 are configured to position the airbag 300 and the location of the bend 332 relative to the occupant 40, as shown in FIG. 6. The airbag 300 and tethers 320, 330 can also be configured to position the airbag relative to the instrument panel 28, for example, to follow the general shape or contour of the instrument panel. While the airbag 300 is illustrated as being spaced from the instrument panel 28 in FIG. 6, it could be configured to engage the instrument panel and also to fill the space between the instrument panel and the roof 24 and/or windshield.

Like the other example configurations disclosed herein, the bend 332 between airbag segments B and C is advantageous because it follows the curved nature of the occupant 40, restrained by the seatbelt, as the occupant leans or bends forward into contact with the airbag. The curved surface of the airbag 300 at the bend 332 receives the forward-moving occupant 40 and conforms to the occupant, cushioning the occupant and providing a desired ride-down effect. Because the terminal end of the lower portion C is positioned in the lap/hip region of the occupant, the lower end of the airbag is received between the upper legs 50 and torso 42 and trapped or blocked from forward movement in response to the penetrating occupant 40. As a result, movement and penetration of the upper torso 42 and head 44 into the airbag 300 tends to straighten or un-bend the bend 332.

When this un-bending of the bend 332 occurs, the unbending/uncurving can cause the front panel 310 to crumple and form creases in the convex surface of the front panel. It is the differential in lengths of the front and rear panels 310, 312 along the bend/curve that produces this crumpling and the resultant formation of the creases. The unbending causes airbag segments B and C to straighten take on a more linear shape. Because, however, the second external tether 330 is connected to the rear panel 312, the effective length of the rear panel is maintained shorter than the length of the front panel 310, despite the unbending. As a result of this length differential between the front and rear panels 310, 312, the crumpling occurs and the creases are formed form in the front panel 310 in regions of the upper and lower extents of the bend 332.

The areas in which the crumpling occurs and the creases form correspond generally to the locations of the stitch lines 334 connecting the external tether 330 to the rear panel 312. Accordingly, the locations where the creases form can be selected through the configuration of the external tether 330 and the locations of the stitch lines 334 connecting it to the airbag 300. Advantageously, the manufacture of the airbag 300 is not complicated because the tethers 320 and 330 are external. The airbag 300 is therefore simple and easy to manufacture.

Figure 7:
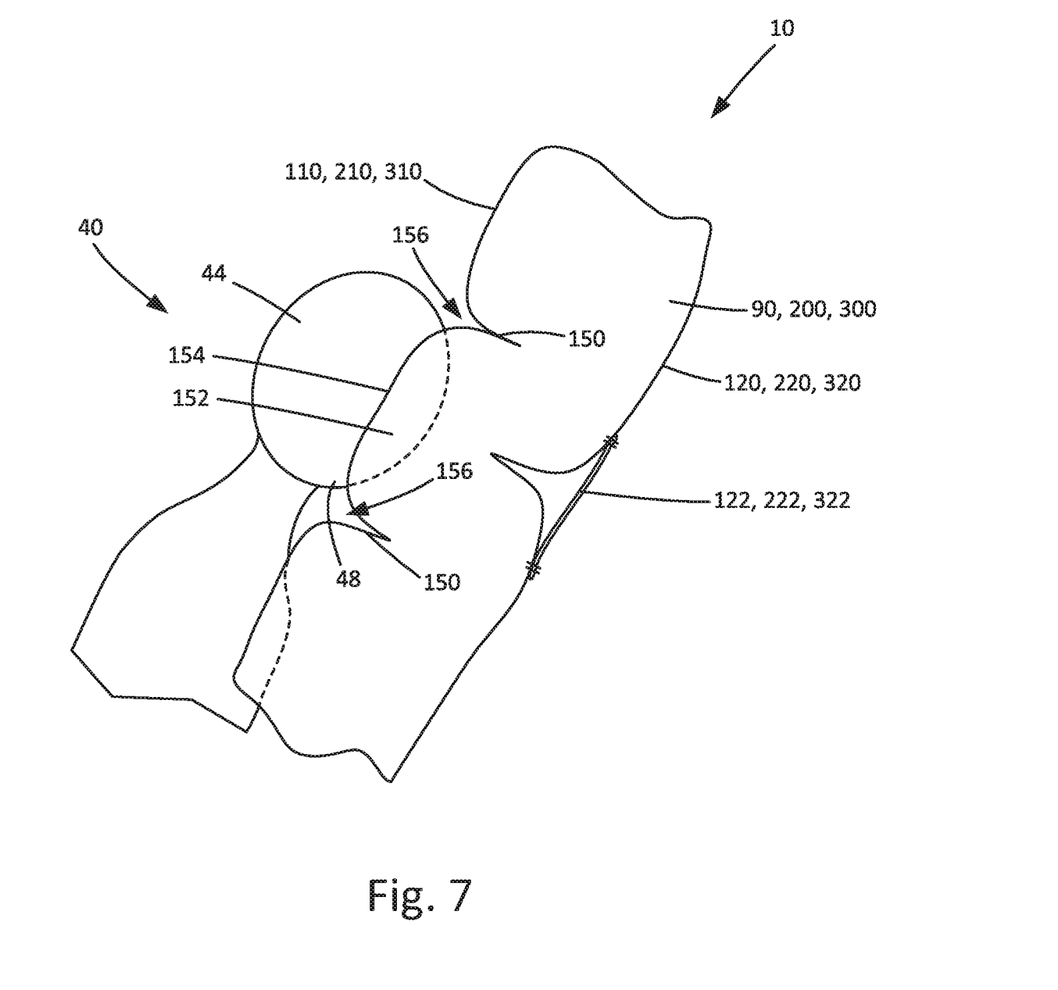
FIG. 7 is a schematic illustration of the apparatus according to any of the first, second, and third example configurations receiving the occupant.

FIG. 7 illustrates a portion of the safety system according to any of FIGS. 1-6, and therefore is representative of the airbag 90 (FIGS. 1-4D), the airbag 200 (FIG. 5), and the airbag 300 (FIG. 6). Referring to FIG. 7, advantageously, the creases 150 help define a lobe or chamber 152 for receiving the occupant's head 44. The fabric surface 154 of the chamber 152 that receives the occupant's head 44 is separated or isolated from adjacent surfaces of the front panel 110, 210, 310 by the creases 150 in the front panel.

Due to the crumpled/creased configuration of the fabric forming the creases 150, the creased portions of the front panel 110, 210, 310 are not tensioned to the extent that the remaining portions of the front panel, i.e., the surface 154 of the chamber and the portions of the front panel on opposite sides of the creases 150, are tensioned due to inflation fluid pressurization of the airbag 90, 200, 300. The creases 150 thus not only help define the chamber 152 for receiving the occupant's head 44, they also help isolate the chamber from the adjacent portions of the front panel 110, 210, 310. This allows the chamber 152 to respond to the impacting occupant by moving relative to the remaining portions of the airbag 90, 200, 300 while, at the same time, cushioning the occupant and providing a desired ride-down effect.

Additionally, owing to the configuration of the airbag 90, 200, 300 and the second external tether 122, 222, 322 the creases 150 are configured to be positioned in the areas above and below the penetrating occupant's head 44, i.e., at or above the head and below the chin 48. The configurations of the airbag 90, 200, 300 and external tether 122, 222, 322 are selected to position the creases 150 to prevent the occupant's chin 48 from entering the crease and from engaging portions of the front panel 110, 210, 310 on the opposite side of the crease. As a result, the surface 154 of the chamber 152 can be maintained smooth and without creases, and can therefore provide an effective inflated cushion for the occupant's head.

As shown in FIG. 7, the creases 150 cause portions of the airbag 90, 200, 300 above and below the occupant's head 44 to pull away, forming spaces or gaps 156 between the chamber 152 and the adjacent portions of the airbag 90, 200, 300. As a result, engagement of these adjacent portions of the airbag 90, 200, 300 with the top of the occupant's head 44 and the occupant's chin 48 is reduced. Beneficially, further penetration of the occupant's head 44 into the chamber 152 increases the size of the gaps 156, which helps further avoid head/chin contact with adjacent airbag surfaces. This helps reduce the degree to which engagement of the airbag 90, 200, 300 with the occupant's head 44 and chin 48 results in neck bending/loading.

Figure 8A:
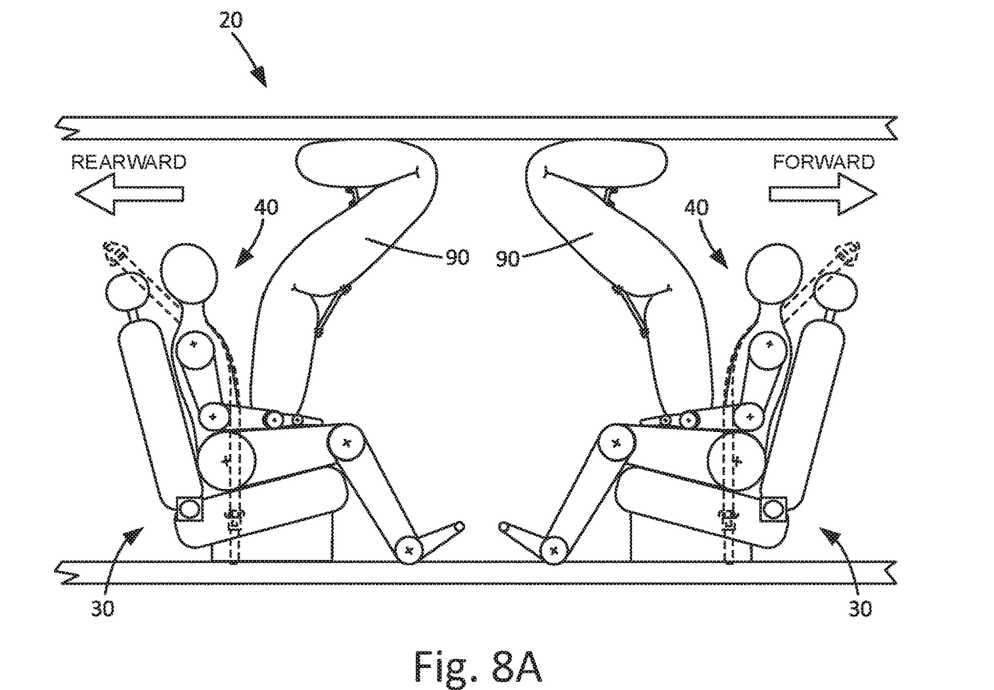
FIGS. 8A and 8B are schematic illustrations representing example vehicle seating arrangements in which the apparatus of FIGS. 1-7 can be implemented.
Figure 8B:
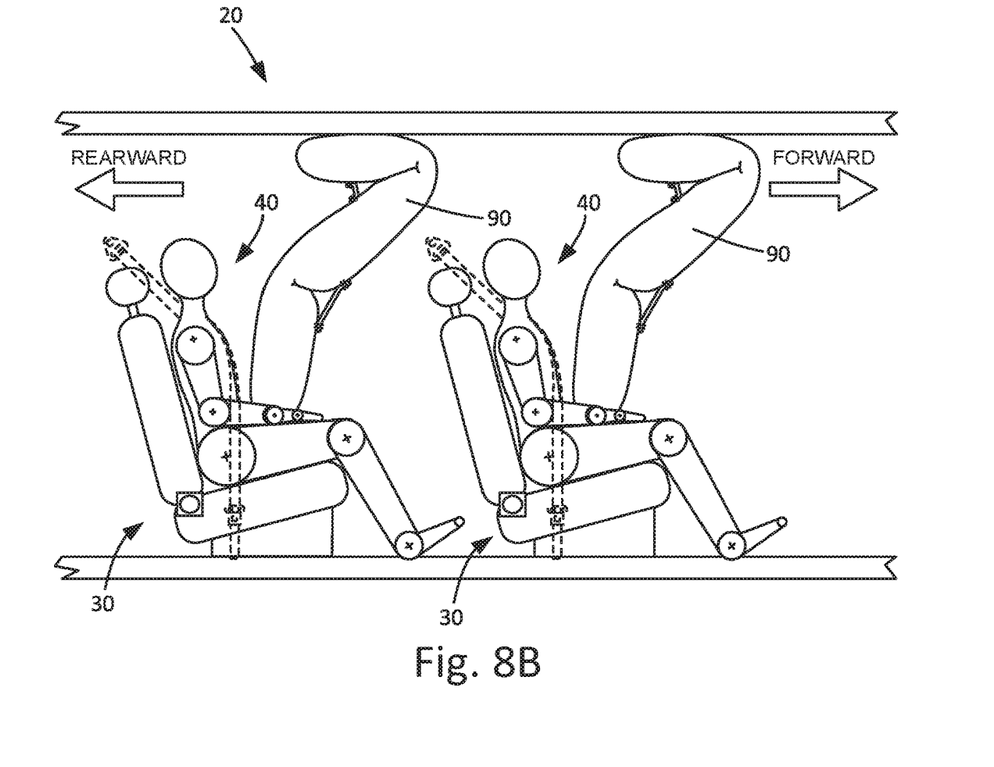

FIGS. 8A and 8B illustrate airbags 90 implemented in two different seating arrangements. In FIG. 8A, the seats 30 and the occupants 40 face each other. In FIG. 8B, the seats 30 and the occupants 40 are both forward-facing. Any of the airbag configurations described herein can be implemented with these seating arrangements. The airbag 90 of FIGS. 1-3 is shown in FIGS. 8A and 8B. The airbag 200 of FIG. 5 or the airbag 300 of FIG. 6 can also be implemented in a vehicle 20 having these seating arrangements.

What have been described above are example configurations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

We claim:

1. An apparatus for helping to protect an occupant of a vehicle having a roof and a cabin with a seat for the occupant, comprising:
    an airbag configured to be deployed from the roof of the vehicle, the airbag comprising a front panel configured to face the occupant and a rear panel configured to face away from the occupant; and
    an external tether having ends connected to the rear panel on an exterior of the airbag, the external tether having a length measured between the ends that is shorter than a length of the rear panel extending between the connections of the external tether to the rear panel so as to cause the airbag to have a curved portion when inflated and deployed, the curved portion being configured to face convexly toward the occupant, wherein the airbag has an upper end portion configured to be connected to the vehicle roof, and an opposite lower end portion configured to be received in a lap/hip region of the occupant so that the lower end portion is blocked from forward movement in response to occupant penetration by upper legs of the occupant.

2. The apparatus recited in claim 1, wherein:
    the curved portion is configured to receive an occupant's head and to unbend in response to receiving the occupant's head, wherein the unbending causes the front panel to crumple and form creases; and
    wherein the configuration of the external tether, position of the external tether on the rear panel, and connections of the external tether to the rear panel are configured to position the curved portion to receive the occupant's head and to control the formation and location of the creases on the front panel.

3. The apparatus recited in claim 2, wherein the external tether is configured to locate the creases on the front panel at a position above the occupant's head and/or below a chin of the occupant.

4. The apparatus recited in claim 2, wherein the external tether is configured to locate a crease on the front panel at a position above the occupant's head and a crease on the front panel at a position below a chin of the occupant.

5. The apparatus recited in claim 2, wherein the creases are configured to define a chamber configured to receive the occupant's head, the chamber being separated from adjacent portions of the airbag by the creases.

6. The apparatus recited in claim 5, wherein the creases are configured to shift and/or unfold in response to occupant penetration into the chamber to permit the chamber to move relative to adjacent portions of the airbag.

7. The apparatus recited in claim 5, wherein the creases are configured to form a gap for preventing a top of the occupant's head from engaging portions of the airbag adjacent the chamber.

8. The apparatus recited in claim 5, wherein the creases are configured to form a gap for preventing a chin of the occupant from engaging portions of the airbag adjacent the chamber.

9. The apparatus recited in claim 5, wherein the creases are configured to form a gap for preventing the occupant's head from engaging portions of the airbag adjacent the chamber to reduce loading and/or bending of a neck of the occupant.

10. The apparatus recited in claim 2, wherein the creases in the front panel correspond to locations where the external tether is connected to the rear panel.

11. The apparatus recited in claim 1, further comprising an additional external tether connected to the airbag, the additional external tether being configured to control a deployment trajectory of the airbag from the roof.

12. The apparatus recited in claim 1, further comprising an additional external tether connected to the airbag, the additional external tether being configured to control an inflated shape of the airbag so that the airbag can conform to architecture of the vehicle.

13. An airbag module comprising:
    the apparatus of claim 1;
    an inflator that is actuatable to produce inflation fluid for inflating and deploying the airbag; and
    a housing for supporting the airbag and inflator on the vehicle roof.

14. A vehicle safety system comprising the airbag module in claim 13.

15. The vehicle safety system recited in claim 14, further comprising:
    a sensor for sensing an occurrence of an event for which deployment of the airbag is desired and producing a signal indicative thereof; and
    a controller connected to the sensor and, in response to receiving the signal, actuating the inflator to inflate and deploy the airbag.

16. The apparatus recited in claim 1, wherein the ends of the external tether are connected to the rear panel by connections that extend across a width of the external tether and a width of the rear panel, perpendicular to the length of the tether and the length of the rear panel.

17. The apparatus recited in claim 16, wherein the curved portion is configured to receive an occupant's head and to unbend in response to receiving the occupant's head, wherein the unbending causes the front panel to crumple and form creases that extend across a width of the front panel in an area of the front panel that corresponds to the connections connecting the external tether to the rear panel.

18. The apparatus recited in claim 17, wherein the connections have locations and extents along the rear panel that are configured so that the creases are formed in an area of the front panel positioned just above the occupant's head and just below a chin of the occupant.

19. The apparatus recited in claim 18, wherein the connections have locations and extents along the rear panel that are configured so that the creases are configured to form a gap for preventing the chin of the occupant from engaging portions of the airbag adjacent the curved portion.

20. The apparatus recited in claim 18, wherein the connections have locations and extents along the rear panel that are configured so that the creases are configured to form a gap for preventing the occupant's head from engaging portions of the airbag adjacent the curved portion to reduce loading and/or bending of a neck of the occupant.

21. The apparatus recited in claim 1, wherein the front and rear panels are configured to define an inflatable confinement where the front and rear panels, without influence from the external tether, are configured to form a flat cushion with generally uniform thickness, and wherein the bend in the airbag is formed solely as a result of the connection of the external tether to the rear panel.

22. The apparatus recited in claim 1, wherein the lower end portion of the airbag is configured to be trapped between the upper legs and a torso of the occupant in response to occupant penetration.

\* \* \* \* \*